United States Patent Office

3,597,409
Patented Aug. 3, 1971

3,597,409
PROCESS FOR RECOVERING IMMUNOGLOBULIN
A AND IMMUNOGLOBULIN M
Charles Benedict Breuer, Pearl River, N.Y., assignor to
American Cyanamid Company, Stamford, Conn.
No Drawing. Filed May 25, 1970, Ser. No. 40,399
Int. Cl. C07g 7/00
U.S. Cl. 260—112B                                      6 Claims

ABSTRACT OF THE DISCLOSURE

This disclosure describes a multistep process for recovering an immunoglobulin A enriched preparation and an immunoglobulin M enriched preparation from human blood protein fractions, said preparations being useful for the prophylaxis and therapy of certain infectious diseases.

BRIEF SUMMARY OF THE INVENTION

This invention relates to a method of recovering an immunoglobulin A enriched fraction and an immunoglobulin M enriched fraction, both fractions consisting essentionally of γ-globulin and the respective immunoglobulin, from certain by-product fractions obtained from the process of preparing normal human serum proteins. More particularly, the human blood protein fraction starting material is dissolved in aqueous saline buffer and then diluted to lower ionic strength under defined conditions whereupon a euglobulin subfraction enriched in immunoglobulin M precipitates while the immunoglobulin A remains in solution. The euglobulin subfraction is redissolved in aqueous saline buffer and reprecipitated by dilution to lower ionic strength whereby an immunoglobulin M enriched preparation, consisting essentially of γ-globulin and immunoglobulin M, is obtained.

The supernatant fluid containing the immunoglobulin A, obtained from the initial step, is processed by a series of stages involving removal of undesired proteins by precipitation as zinc complexes, precipitation of immunoglobulin A with a lower alkanol, redissolution of the immunoglobulin A in aqueous saline buffer and reprecipitation by means of polyethylene glycol or ammonium sulfate. The final product is considerably enriched in immunoglobulin A with the remainder of the protein consisting essentially of γ-globulin.

DETAILED DESCRIPTION OF THE INVENTION

Immunoglobulin A was first isolated from human serum by J. F. Heremans [Clin. Chim. Acta 4, 96 (1959)] by a process based upon the solubility of the complex of zinc with immunoglobulin A. The crude immunoglobulin A thus obtained was finally purified by zone electrophoresis but the method was generally unsatisfactory. Another method of isolating immunoglobulin A is based upon chromatographic separation on DEAE-cellulose followed by precipitation of impurities with caprylic acid; Steinbuch et al., Transfusion. T. VIII, No. 2, 141 (1965).

Immunoglobulin M was first isolated from human serum by H. J. Muller-Eberhard [Proc. Soc. Exptl. Biol. Med. 93, 146 (1956)] by ultracentrifugation followed by purification by zone electrophoresis. Other methods of isolating immunoglobulin M have been based upon filtration on Sephadex® G-200, a combination of preparative electrophoresis with chromatograph on DEAE-cellulose, and ammonium sulfate precipitations alternating with dialyses; Steinbuch et al., supra.

As pointed out above, the prior art methods of recovering immunoglobulin A and immunoglobulin M fractions from human serum are cumbersome, expensive, and time-consuming. It is an advantage of the novel process of the present invention that exotic techniques such as electrophoresis and chromatography are unnecessary and hence the recovery of the immunoglobulins may be carried out on a large scale. It is a further advantage of the novel process of the present invention that the reagents required are readily available and relatively inexpensive.

As starting material for the novel process of the present invention, there may be employed any human blood protein fraction which contains immunoglobulin A and immunoglobulin M. These immunoglobulins invariably occur together in such fractions and associated with a major proportion of γ-globulin and lesser amounts of fibrinogen, albumin, prothrombin, α-globulins, β-globulins, macroglobulins, placental lactogen and other serum proteins. A preferred starting material derived from placental blood is the fraction designated III$_1$ by Cohn et al., J. Am. Chem. Soc. 68, 459 ff. (1946). These starting materials are generally available as pastes containing about 40% protein, the remainder being inorganic salts and alcohol.

In carrying out the novel process of my invention, the human blood protein fraction starting material is first dissolved in an aqueous buffer solution which is also at least 0.15 molar with respect to sodium chloride. The practical upper limit of the sodium chloride concentration in the buffer solution is 0.25 molar, but any sodium chloride concentration within the range of 0.15–0.25 molar gives a solution of sufficient ionic strength to dissolve the starting material. It is an advantage of the present invention that any aqueous buffer system may be employed so long as the pH range is from 6.8 to 7.2, preferably about 7.0. Suitable buffers which may be employed are for example, 0.01 molar potassium dihydrogen phosphate, 0.01 molar potassium biphthalate, McIlvaine's buffer, or the buffer systems of Clark and Lubs [Remington's Practice of Pharmacy, 12th Ed., 208 (1961)]. The starting material is dissolved in the aqueous saline buffer in the proportion of from about 50 milligrams to about 250 milligrams of starting material per milliliter of aqueous saline buffer. Since the starting material pastes are sometimes quite acidic, it may be necessary to readjust the pH of the resulting solution, and 4 N potassium hydroxide is preferred in such case. This initial dissolution step and all subsequent steps in the process (with the exception of the polyethylene glycol and lower alkanol precipitations) are carried out at a temperature of from about 0° to about 5° C. As a practical matter, the entire process is best carried out in a cold room having a temperature of from about 2° C. to about 4° C.

The resulting solution of blood protein fraction starting material in aqueous saline buffer is then diluted to lower ionic strength with distilled water in the ratio of from about seven-fold to about ten-fold dilution, preferably about eight-fold dilution. This dilution results in a precipitate of a euglobulin subfraction containing immunoglobulin M, while the immunoglobulin A remains in solution. Although the euglobulin subfraction may be harvested immediately upon dilution, it is preferable to stir the suspension for a period of time from about 4 to about 16 hours or so. The euglobulin subfraction is harvested by any convenient means such as filtration or centrifugation and the supernatant fluid containing the immunoglobulin A is set aside for further processing.

The euglobulin subfraction is redissolved in pH 6.8–7.2 aqueous buffer solution containing 0.15–0.25 molar sodium chloride until a final concentration of about 10% protein is reached. Again, any aqueous saline buffer system may be used such as those set forth hereinabove so long as the pH range is from 6.8 to 7.2, preferably about 7.0. The aqueous saline buffer employed in this step may be the same as used in the initial dissolution step or it may be different. The resulting solution is then diluted with distilled water in the ratio of from about seven-fold to about ten-fold dilution, preferably about eight-fold dilution. Although the thus precipitated immunoglobulin M enriched material may be harvested forthwith, best results are obtained if the suspension is stirred for a period of a few hours prior to filtration or centrifugation. The immunoglobulin M enriched material thus obtained contains 20–40% of immunoglobulin M, 30–60% of γ-globulin, and traces of other serum proteins.

The volume of the supernatant fluid containing the immunoglobulin A obtained in the first separation step of the process is measured. To this solution is then added a 0.4–0.6 molar solution of a zinc salt in water containing about 25% ethanol. The zinc salts which may be employed are those of a weak acid such as zinc acetate, zinc benzoate, zinc butyrate, zinc carbonate, zinc oxalate, zinc tartrate, etc. This zinc solution is added to the supernatant fluid containing the immunoglobulin A until a final zinc molarity of about 0.005 is reached whereupon a heavy precipitate of the zinc complexes of unwanted serum proteins forms. Although this precipitate may be removed immediately, stirring for a period of several hours is preferred prior to removal of the precipitate by filtration or centrifugation. To the resulting clarified solution is then added a lower alkanol such as methanol, ethanol, isopropanol, etc. until a final lower alkanol concentration of from about 20% to about 30% preferably about 25% is reached. The addition of the lower alkanol precipitant results in the precipitation of an immunoglobulin A enriched fraction which may be removed immediately. However, stirring the suspension for a few hours prior to removal of the immunoglobulin A enriched fraction by any convenient means gives best results. This lower alkanol precipitation step is carried out within a temperature range of from about −10° C. to about 0° C.

This immunoglobulin A enriched fraction is then redissolved in pH 6.8–7.2 aqueous buffer solution containing 0.15–0.25 molar sodium chloride until a final concentration of about 5% protein is reached. Again, any aqueous saline buffer system may be employed such as those set forth hereinabove, and it may be the same or different as the aqueous saline buffer system employed in the initial dissolution step. The immunoglobulin A enriched material is then reprecipitated either with ammonium sulfate or with polyethylene glycol in aqueous saline buffer. In the case of the ammonium sulfate precipitation, ammonium sulfate is added to the solution of immunoglobulin A enriched fraction in aqueous saline buffer until a final concentration of from about 40% to about 50% ammonium sulfate is reached, preferably about 45%. The resulting suspension is preferably stirred for a few hours and then the immunoglobulin A enriched material is removed by filtration of centrifugation.

In the case of the polyethylene glycol precipitation of the immunoglobulin A enriched fraction from the aqueous saline buffer solution, a solution of about 50% polyethylene glycol in pH 6.8–7.2 aqueous buffer solution containing 0.15–0.25 molar sodium chloride is added until a final concentration of from about 8% to about 10% of polyethylene glycol, preferably about 9%, is reached. Any aqueous saline buffer system may be employed such as those set forth hereinabove; however, best results are obtained if the polyethylene glycol containing aqueous saline buffer system is the same as the aqueous saline buffer system containing the immunoglobulin A enriched fraction to which it is added. After precipitation of the immunoglobulin A enriched fraction with polyethylene glycol, the suspension is stirred for a few hours and the immunoglobulin A enriched material is then removed by filtration or centrifugation. This polyethylene glycol precipitation step is carried out within a temperature range of from about 18° C. to about 25° C. The immunoglobulin A enriched material thus obtained contains about 30–60% immunoglobulin A, about 30–50% γ-globulin, and traces of human placental lactogen and $\alpha_2$-macroglobulin.

The polyethylene glycol contemplated in the practice of the present invention consists of a mixture of non-volatile, normally liquid, polyethylene glycols which are soluble in both water and organic liquids and which have molecular weights in the range of from about 4,000 to about 20,000. Such mixtures of polyethylene glycols are commercially available and are usually obtained by condensing glycol with ethylene oxide. As a rule, it is preferred to carry out the process with a polyethylene glycol having a limited molecular weight range, more particularly composed of molecules the molecular weights of which are essentially within a narrow range by comparison with the total range as specified above. Thus, although various mixtures of the aforementioned non-volatile polyethylene glycols may be employed, it is preferred to use a mixture of polyethylene glycols having an average molecular weight of about 6000. Such a mixture is usually referred to as polyethylene glycol 6000.

For therapeutic use, the immunoglobulin M enriched material is dissolved in 0.15 molar sodium chloride containing a preservative such as methiolate, sterile filtered, and vialed in concentrations of 50–100 mg./ml. The immunoglobulin A enriched material is first dissolved in 0.25 molar glycine and lyophilized. The lyophilized powder is reconstituted at a concentration of 12% protein in sufficient aqueous glycine:NaCl to make a final solution 0.3 molar in glycine and 0.15 molar in sodium chloride. Merthiolate is added to a 1:10,000 final concentration and the solution is sterile filtered and vialed. The parenteral formulations thus prepared are useful for the prophylaxis and therapy of bacterial and viral infections.

The immunoglobulin A and immunoglobulin M formulations thus prepared contain a high concentration of antibodies and mere traces of impurities which do not prejudice their therapeutic utility. However, immunoglobulin preparations which are to be made the object of an immunochemical study must be extremely pure. In such case, the immunoglobulin A and immunoglobulin M enriched materials prepared by the novel process of the present invention may be further purified as follows.

The immunoglobulin A enriched material is dissolved in pH 6.8–7.2 aqueous buffer solution containing 0.15–0.25 molar sodium chloride until a final concentration of 5–10% protein is reached. Caprylic acid is added to the resulting solution until a final caprylic acid concentration of about 2% is reached. The resulting suspension is stirred vigorously at room temperature (15°–30° C.) for about 30 minutes and then the precipitated material is removed by filtration or centrifugation and discarded. The clarified solution is then lyophilized to dryness. The resulting powder is reconstituted in 0.15–0.25 molar sodium chloride and dialized against the same solution at 0° C. to 5° C. whereby an extremely pure mixture of immunoglobulin A and γ-globulin is obtained. The immunoglobulin M enriched material is dissolved in pH 6.8–7.2 aqueous buffer solution containing 0.15–0.25 molar sodium chloride until a final concentration of about 10% protein is reached. The resulting solution is clarified and then diluted seven-fold to ten-fold with distilled water. The resulting precipitate is removed by filtration or centrifugation and dried whereby an extremely pure mixture of immunoglobulin M and γ-globulin is obtained.

DESCRIPTION OF THE PREFERRED EMBODIMENT

The invention will be described in greater detail in conjunction with the following specific examples

Example 1

Two kilograms of $III_1$ fraction were dissolved in 10 liters of 0.01 M $K_2HPO_4$, 0.15 M NaCl pH 7.0 with stirring at 2° C. The pH of the mixture was maintained at 6.8 with 4 N KOH. This solution was diluted to 90 liters with distilled water at 2° C.; stirred for 4 hours and allowed to settle overnight. The suspension was centrifuged at 2° C.; 88 liters of supernatant were collected and held for further processing of immunoglobulin A.

(A) The precipitate, weighing 172 g., was dissolved in one liter of original buffer, filtered through asbestos pads and centrifuged to remove insoluble material. The filtrate was diluted to 9 liters with cold distilled water, stirred for one hour at 2° C. and allowed to settle overnight. The precipitate containing immunoglobulin M was collected by centrifugation. The precipitate was dissolved in original buffer to which 0.001% merthiolate had been added, centrifuged to remove a small amount of insoluble material, and stored at 4° C. The final solution was made to 10% protein and assayed by quantitative immunodiffusion. Analyses revealed that the preparation consisted of 54% immunoglobulin M, 35% γ-globulin, 2% immunoglobulin A, with the remaining proteins being unidentified.

(B) The 88 liters of original supernatant were stirred at 2° C. and 0.5 M zinc acetate in 25% ethanol at pH 6.2 added dropwise until a final molarity of 0.005 in zinc was reached. The suspension was stirred for two hours and allowed to settle overnight. The suspension was centrifuged. The precipitate weighing 1527 g. was discarded. Supernatant, 85 liters, was brought to −5° C. in a refrigerated tank and 95% ethanol at −20° C. was added with stirring until a final concentration of 25% ethanol was reached. The temperature was maintained at −5° C. and held overnight. The suspension was then centrifuged. Supernatant fluid was discarded, and the precipitate, weighing 800 g., was dissolved in 2 liters of phosphate-saline buffer at room temperature. The solution was diluted to 5% protein, stirred, and a solution of 50% polyethylene glycol 6000 in buffer was added to a final 9% concentration of polyethylene glycol. The suspension was stirred for one hour at room temperature and then centrifuged. Supernatant fluid was discarded, and the precipitate, weighing 467 g., was dissolved in 2.5 liters of phosphate-saline buffer at room temperature. The solution was stirred, and caprylic acid was added dropwise to a final 2% concentration. The suspension was centrifuged after being stirred for 30 minutes. Precipitate was discarded, and the supernatant was lyophilized to dryness. The weight of the powder was 69.1 grams. An aliquot of powder was removed, dissolved in 0.15 M NaCl containing 0.001% merthiolate and dialyzed for 24 hours against the same solution at 2° C. Assays of the dialyzed solution showed the lyophilized powder possessed a protein content of 65%. The proteins consisted of 48% immunoglobulin A, 44% γ-globulin and 8% immunoglobulin M.

Example 2

Fifty grams of placental III₁ fraction was dissolved in 250 ml. of 0.01 M K₂HPO₄, 0.15 M NaCl, pH 7.0, with stirring at 2°–4° C. The pH of the mixture was maintained at 6.8 with 4 N KOH. The solution of III₁ was diluted to 1900 ml. with cold distilled water and stirred for two hours. The precipitate containing immunoglobulin M was collected by centrifugation and the supernatant held for subsequent isolation of immunoglobulin A.

The precipitate was redissolved in 200 ml. of original buffer at 2°–4° C., diluted to 1600 ml. with cold distilled water, stirred briefly and allowed to settle overnight. The precipitate was collected by centrifugation, redissolved in 30 ml. of original buffers and clarified by high speed centrifugation. The final preparation, assayed by quantitative immunodiffusion, consisted of 52% immunoglobulin M, 17% gamma-globulin, 4% immunoglobulin A and traces of other serum proteins.

The original supernatant, 2200 ml., was stirred at 2°–4° C. An aqueous solution of 0.5 M zinc acetate containing 25% ethanol at pH 6.2 was added dropwise until a final zinc molarity of 0.005 was reached. The suspension was stirred for 2 hours and then centrifuged. Precipitated material was discarded, and the supernatant, 2150 ml., was chilled to −5° C. in an ice-salt bath. The solution was stirred and 95% ethanol at −20° C. was added until a final alcohol concentration of 25% was reached. The suspension was stirred for one hour with the temperature maintained at −5° to 0° C. and then the precipitate was collected by centrifugation in a refrigerated centrifuge.

The precipitate was redissolved in 200 ml. of original buffer and stirred at 2°–4° C. Ammonium sulfate was added to a final 45% saturation level and the suspension stirred for one hour and allowed to settle overnight.

The precipitate was collected by centrifugation, redissolved in 80 ml. of 0.15 M NaCl containing 0.001% merthiolate, and dialyzed for 48 hours against the same solution. The final preparation, assayed by quantitative immunodiffusion, contained 19% immunoglobulin A, 58% gamma-globulin, and 16% immunoglobulin M.

I claim:

1. The process of recovering an immunoglobulin A enriched material, consisting essentially of immunoglobulin A and γ-globulin, from a human blood protein fraction containing them which comprises the steps of:
    (a) dissolving said blood protein fraction in pH 6.8–7.2 aqueous buffer solution containing 0.15–0.25 molar sodium chloride in the proportion of 50–250 mg. of blood protein fraction per ml. of aqueous buffer solution,
    (b) diluting the resulting solution from about seven-fold to about ten-fold with water,
    (c) removing precipitated material from the resulting suspension,
    (d) adding a 0.4–0.6 molar aqueous zinc salt solution containing about 25% ethanol to the clarified solution until a final zinc molarity of about 0.005 is reached,
    (e) stirring the resulting suspension for a few hours,
    (f) removing precipitated material from the suspension,
    (g) adding a lower alkanol to the clarified solution until a final lower alkanol concentration of from about 20% to about 30% is reached,
    (h) stirring the resulting suspension for a few hours,
    (i) removing precipitated immunoglobulin A enriched material from the suspension,
    (j) dissolving the immunoglobulin A enriched material in pH 6.8–7.2 aqueous buffer solution containing 0.15–0.25 molar sodium chloride until a final concentration of about 5% protein is reached,
    (k) adding to the resulting solution a solution of about 50% polyethylene glycol in pH 6.8–7.2 aqueous buffer solution containing 0.15–0.25 molar sodium chloride until a final concentration of from about 8% to about 10% polyethylene glycol is reached,
    (l) stirring the resulting suspension for a few hours, and
    (m) removing precipitated immunoglobulin A enriched material from the suspension;
steps (a) through (f) being carried out at from about 0° C. to about 5° C., steps (g) through (i) being carried out at from about −10° C. to about 0° C., and steps (j) through (m) being carried out at from about 18° C. to about 25° C.

2. A process in accordance with claim 1 wherein the aqueous buffer solution of step (a) is 0.01 M KH₂PO₄ solution, the zinc salt is zinc acetate, the lower alkanol precipitate is ethanol, the aqueous buffer solution of step (j) is 0.01 M KH₂PO₆ solution, the polyethylene glycol has an average molecular weight of about 6000, and the aqueous buffer solution of step (k) is 0.01 M KH₂PO₄ solution.

3. The process of recovering an immunoglobulin A enriched material, consisting essentially of immunoglobulin A and γ-globulin, from a human blood protein fraction containing them which comprises the steps of:
    (a) dissolving said blood protein fraction in pH 6.8–7.2 aqueous buffer solution containing 0.15–0.25 molar sodium chloride in the proportion of 50–250 mg. of blood protein fraction per ml. of aqueous buffer solution, (b) diluting the resulting solution from about seven-fold to about ten-fold with water, (c) removing precipitated material from the resulting suspension, (d) adding a 0.4–0.6 molar aqueous zinc salt solution containing about 25% ethanol to the clarified solution until a final zinc molarity of about 0.005 is reached, (e) stirring the resulting suspension for a few hours, (f) removing precipitated material from the suspension, (g) adding a lower alkanol to the clarified solution until a final lower alkanol concentration of from about 20% to about 30% is reached, (h) stirring the resulting suspension for a few hours, (i) removing precipitated immunoglobulin A enriched material from the suspension, (j) dissolving the immunoglobulin A enriched material in pH 6.8–7.2 aqueous buffer solution containing 0.15–0.25 molar sodium chloride until a final concentration of about 5% protein is reached, (k) adding solid $(NH_4)_2SO_4$ to the resulting solution until a final concentration of about 45% $(NH_4)_2SO_4$ is reached, (l) stirring the resulting suspension for a few hours, and (m) removing precipitated immunoglobulin A enriched material from the suspension;

steps (a) through (f) and (j) through (m) being carried out at from about 0° C. to about 5° C., and steps (g) through (i) being carried out at from about −10° C. to about 0° C.

4. A process in accordance with claim 3 wherein the aqueous buffer solution of step (a) is 0.01 M $KH_2PO_4$ solution, the zinc salt is zinc acetate, the lower alkanol precipitant is ethanol, and the aqueous buffer solution of step (j) is 0.01 M $KH_2PO_4$ solution.

5. The process of claim 1 including, in combination therewith, the additional steps of dissolving the immunoglobulin A enriched material in pH 6.8–7.2 aqueous buffer solution containing 0.15–0.25 molar sodium chloride until a final concentration of 5–10% protein is reached, adding caprylic acid to the resulting solution until a final caprylic acid concentration of about 2% is reached, stirring the resulting suspension for about 30 minutes, removing precipitated material from the suspension, lyophilizing the resulting clarified solution; said additional steps being carried out at a temperature of from about 15° C. to about 30° C.

6. The process of claim 3 including, in combination therewith, the additional steps of dissolving the immunoglobulin A enriched material in pH 6.8–7.2 aqueous buffer solution containing 0.15–0.25 molar sodium chloride until a final concentration of 5–10% protein is reached, adding caprylic acid to the resulting solution until a final caprylic acid concentration of about 2% is reached, stirring the resulting suspension for about 30 minutes, removing precipitated material from the suspension, lyophilizing the resulting clarified solution; said additional steps being carried out at a temperature of from about 15° C. to about 30° C.

References Cited

Clin. Chim. Acta, 4, 96 (1959), Heremans.

Chem. Abstracts, vol. 64, 1966, 20403g–h, 20404a, Rothman.

Chem. Abstracts, vol. 70, 1969, 113375q, Zschocke et al.

HOWARD E. SCHAIN, Primary Examiner

U.S. Cl. X.R.

424—177